(12) United States Patent
Zhou

(10) Patent No.: US 8,668,610 B1
(45) Date of Patent: Mar. 11, 2014

(54) ELECTRO-HYDRAULIC SERVO SYNCHRONIZER FOR MW WIND TURBINE GENERATOR SYSTEM

(71) Applicant: Jinan Railway Vehicles Equipment Co., Ltd., Jinan (CN)

(72) Inventor: Chuanhai Zhou, Jinan (CN)

(73) Assignee: Jinan Railway Vehicles Equipment Co., Ltd., Jinan (CN)

( * ) Notice: Subject to any disclaimer, the term of this patent is extended or adjusted under 35 U.S.C. 154(b) by 0 days.

(21) Appl. No.: 13/691,600

(22) Filed: Nov. 30, 2012

(30) Foreign Application Priority Data

Oct. 19, 2012  (CN) .......................... 2012 1 0402241

(51) Int. Cl.
*F16H 3/72* (2006.01)
(52) U.S. Cl.
USPC ................................ 475/1; 475/72
(58) Field of Classification Search
CPC .................................. B60K 6/12; F16H 3/72
USPC ....................................... 475/1, 72
See application file for complete search history.

(56) References Cited

U.S. PATENT DOCUMENTS

| | | | |
|---|---|---|---|
| 7,972,236 B2* | 7/2011 | Hiraki et al. ...................... | 475/5 |
| 2006/0217225 A1* | 9/2006 | Hiraki et al. ..................... | 475/72 |
| 2010/0298081 A1* | 11/2010 | Ivanysynova et al. .......... | 475/72 |

* cited by examiner

*Primary Examiner* — Edwin A Young
(74) *Attorney, Agent, or Firm* — J.C. Patents

(57) ABSTRACT

An electro-hydraulic servo synchronizer for MW wind turbine generator system includes a 2K-H differential planetary drive mechanism and a direct drive volume control system. The 2K-H differential planetary drive mechanism comprises a planet carrier, a planet gear, a ring gear, a sun gear, and a control gear, the input end of the planet carrier is an input shaft I, the output end of the sun gear is an output shaft II, the central shaft of the control gear is a shaft III. The direct drive volume control system comprises a constant displacement motor, a two-way constant delivery pump and a servo motor, the servo motor is connected with the two-way constant delivery pump, the two-way constant delivery pump is connected with the constant displacement motor, and the constant displacement motor is connected with the shaft III, so as to drive the control gear.

8 Claims, 5 Drawing Sheets

ELECTRO-HYDRAULIC SERVO SYNCHRONIZER FOR MW WIND TURBINE GENERATOR SYSTEM

CROSS-REFERENCE TO RELATED APPLICATIONS

This application claims priority to Chinese Patent Application 201210402241.X, filed on Oct. 19, 2012, entitled "Electro-hydraulic Servo Synchronizer for MW Wind Turbine Generator System", which is incorporated herein by reference in its entirety.

FIELD OF THE TECHNOLOGY

The present invention relates to an electro-hydraulic servo synchronizer for megawatt (MW) wind turbine generator system, which is applicable to the design for the transmission chain of today's mainstream MW wind turbine generator system.

BACKGROUND

Wind energy is a clean and renewable energy resource, which is abundant all over the world, inexhaustible and environment-friendly. Wind power generation is therefore safe and clean, capable of providing a long-term and stable energy supply for mankind. Currently, most of major developed countries and developing countries have considered the development of wind power generation technology as their national policies and an important means to meet energy challenges in the new century. The mechanical transmission chain and electric transmission chain are core parts of a wind turbine generator system. As shown in FIG. 1, the mechanical and electric transmission chains of traditional MW wind turbine generator system mainly consist of a wind wheel, an accelerating gearbox, a generator and a converter. Due to fluctuation of wind speed, the rotational speed of the wind wheel is variable, after passing the accelerating gearbox, the rotational speed is increased while the torque is reduced, and the rotational speed is still not constant, once the varying rotational speed is input into the generator, the frequency of the current generated by the generator is also changing, and therefore a converter is needed for rectification to form a current with the desired frequency of the power grid for grid-connection.

Along with the continually increasing proportion of the wind power in the power grid, the wind power's influence on the power grid is gradually increasing, which raises higher requirements for grid-connection on the wind turbine generator system. Currently, the converter technology can't meet all the requirements for connecting electrical power to grid, and sometimes, an additional module needs to be added to meet the requirements on the low voltage ride-through, which increases the complexity of the system and reduces the reliability. With the development of the offshore wind power, higher requirements on the reliability of the wind turbine generator system are raised, and the reliability of high-power electric devices is a key factor restricting the development of the wind turbine generator system. Many organizations at home and abroad have studied on mechanical synchronizers, in an attempt to replace the converter of relatively lower reliability.

The existing mechanical synchronizers mainly are of two types: one is that a differential driving is conducted with the hydraulic torque converter feedback, although such a mechanism has good mobility, the manufacturing is complex, the accuracy requirement is strict, the cost is high and the efficiency of the hydraulic torque converter is low; the other is that the differential mechanism is driven to adjust the speed via a hydraulic servo or a servo motor, the hydraulic servo variable displacement pump or the variable displacement motor is of high cost and slow response, when a servo motor is used alone, there is a need to add a reducer, to increase the rotational inertia of the system, thus the starting and speed controlling performances of the system are inferior to the hydraulic system, the volume is larger and overload protection capacity is lower, and the flexibility is inferior to the hydraulic system.

SUMMARY

In existing wind turbine generator systems, a gearbox is used to increase the rotational speed transmitted from the wind wheel and reduce the torque transmitted from the wind wheel, and mechanical energy is converted into electrical energy by a generator converts. The alternating current (AC) frequency output by the generator constantly changes due to the varying rotational speed of wind wheel, thus in order to obtain AC frequency required by a power grid, a converter is need to convert frequency, and thereby the reliability and complexity of high-power electric devices become key factors restricting the development of the wind turbine generator system. In order to overcome the disadvantages in the prior art, the present invention provides an electro-hydraulic servo synchronizer for MW wind turbine generator system, which is applicable to the design for the transmission chain of today's mainstream MW wind turbine generator system.

The technical solutions adopted by the present invention are as follows:

An electro-hydraulic servo synchronizer for MW wind turbine generator system, comprising a 2K-H differential planetary drive mechanism and a direct drive volume control system, wherein the 2K-H differential planetary drive mechanism comprises a planet carrier, a planet gear, a ring gear, a sun gear, and a control gear, with the planet gear amounted on the planet carrier, the planet gear engaged with the sun gear and ring gear respectively, a central shaft of the ring gear connected with the control gear, a input end of the planet carrier as an input shaft I, a output end of the sun gear as an output shaft II, the central shaft of the control gear as a shaft III; the direct drive volume control system comprises a fixed displacement motor, a two-way fixed displacement pump and a servo motor, with the servo motor connected with the two-way fixed displacement pump, the two-way fixed displacement pump connected with the fixed displacement motor, the fixed displacement motor connected with the shaft III, so as to drive the control gear.

A relief valve, a hydraulic lock and an oil make-up valve are provided between the fixed displacement motor and the two-way fixed displacement pump, with the hydraulic lock and the oil make-up valve located within an integrated valve block.

The relief valve is connected with the fixed displacement motor.

The oil make-up valve consists of two hydraulically-controlled check valves I, and the two hydraulically-controlled check valves I are directly connected with the oil inlet and outlet of the two-way fixed displacement pump.

The hydraulic lock consists of two hydraulically-controlled check valves II, and the hydraulically-controlled check valves II are directly connected with the inlet and outlet of the fixed displacement motor.

The input shaft I is connected with the accelerating gearbox in the transmission chain of the wind turbine generator system, the output shaft II is connected with the generator in the transmission chain of the wind turbine generator system.

The servo motor is connected with the two-way fixed displacement pump via a coupling.

The direct drive volume control system further comprises a supercharged air filter.

The direct drive volume control system further comprises a sealed oil tank and a supercharged air filter, the two-way fixed displacement pump, the hydraulic lock and the oil make-up valve are located within the sealed oil tank, and the supercharged air filter is installed on the sealed oil tank to communicate with the inside of the sealed oil tank.

The supercharged air filter keeps the sealed oil tank maintaining a certain positive pressure, ensures that the oil make-up valve absorbs oil normally, and discharges the excessive air, once the pressure in the sealed oil tank exceeds a preset pressure.

The input shaft I is connected with the accelerating gearbox, the output shaft II is connected with the generator, the 2K-H differential planetary drive mechanism and the direct drive volume control system are connected together via the shaft III. The rotational speed of the input shaft I changes constantly, the output rotational speed of the direct drive volume control system is adjusted based on the rotational speed of the input shaft I and is transmitted to the 2K-H differential planetary drive mechanism via the shaft III. The differential action between the input shaft I and the shaft III ensures a constant speed of the output shaft II, such that the purpose of constant input rotational speed of the generator can be achieved.

The beneficial effects of the present invention are that: an electro-hydraulic servo synchronizer for MW wind turbine generator system is connected between the accelerating gearbox and synchronous generator in series to guarantee a constant rotational speed input to the generator, such that no converter is needed for grid-connection, resulting in the advantages of high reliability and a good quality of power. In the present invention, the direct drive volume control system processes the advantages of, high response speed of the electric servo system combined with large output and good flexibility of hydraulic system. Compared with the hydraulic torque-converter synchronization system, the system adopted by the present invention is simple to manufacture, low in costs and high in efficiency. The servo variable displacement pump or variable displacement motor in the hydraulic servo system are replaced with a servo motor, and the output of the system is adjusted by the changes in rotational speed or rotational direction of the servo motor, so that the response speed is high and cost is low. When the servo motor is combined with the hydraulic system, the rotational inertia of the system is decreased, the starting and speed controlling performances are increased, the volume is much smaller and the overload protection capacity is higher, the system has good flexibility, more suitable for the working condition that the wind turbine generator system has a larger load fluctuation. In addition, the output flow and direction of the two-way fixed displacement pump could be controlled by controlling the rotational speed and direction of the servo motor, thereby the rotational speed and direction of the fixed displacement motor is further controlled. The relief valve prevents destruction caused by the impact load on the direct drive volume control system, and the hydraulic lock consists of two hydraulically-controlled check valves II, preventing the fixed displacement motor from rotating reversely, and the oil make-up valve consists of two hydraulically-controlled check valves I, capable of supplementing oil leakage for the system.

Figure 1:
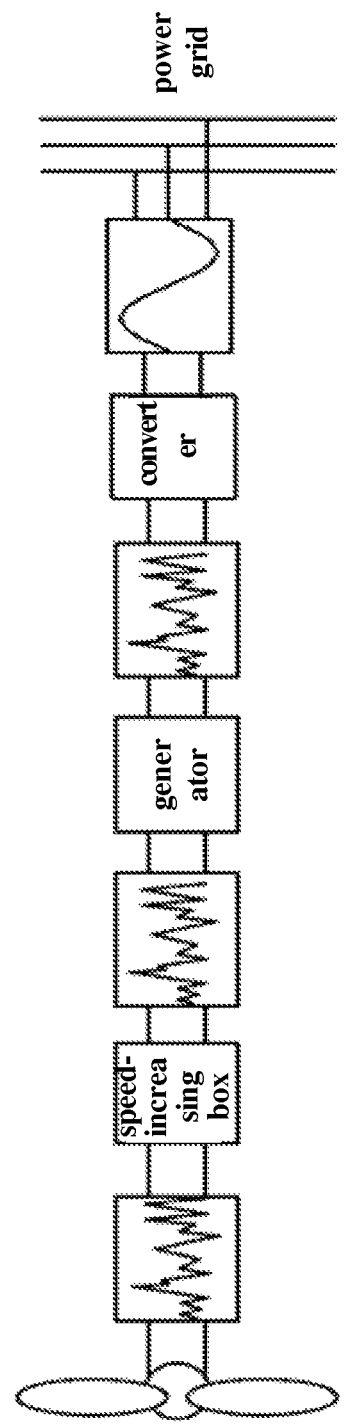
FIG. 1 is a schematic diagram of a transmission chain of a wind turbine generator system using a converter.

In the drawings, 1. planet carrier, 2. planet gear, 3. ring gear, 4. sun gear, 5. control gear, 6. fixed displacement motor, 7. relief valve, 8. hydraulic lock, 9. oil make-up valve, 10. two-way fixed displacement pump, 11. servo motor, 12. rotational speed sensor I, 13. rotational speed sensor II, 14. coupling, 15. integrated valve block, 16. supercharged air filter, 17. sealed oil tank, 18. Hydraulically-controlled check valve I, 19. Hydraulically-controlled check valve II.

DETAILED DESCRIPTION

Figure 2:
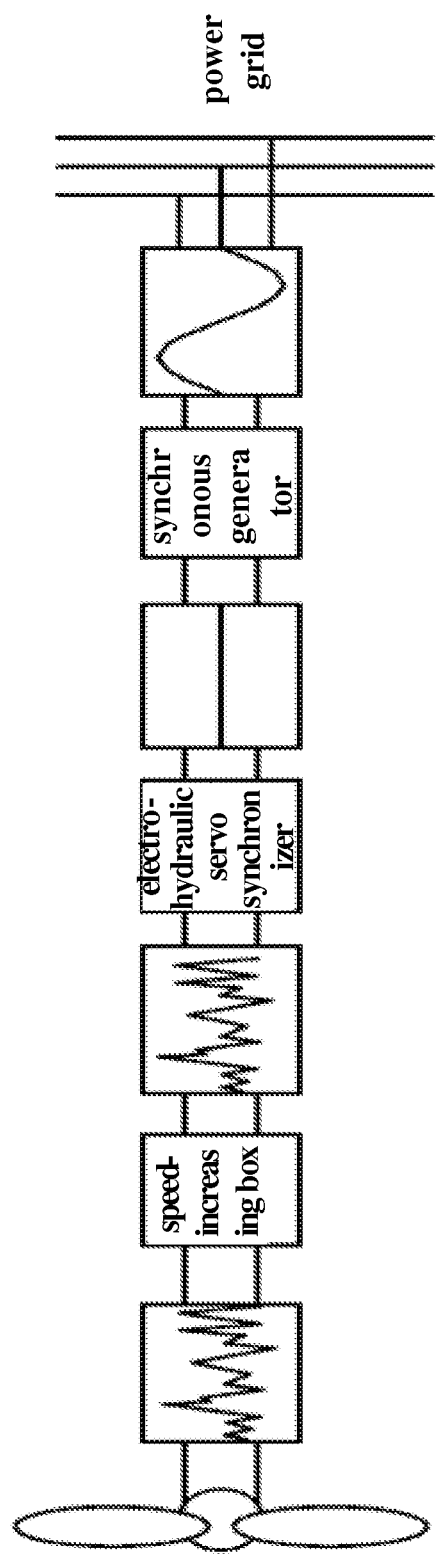
FIG. 2 is a schematic diagram of a transmission chain of a wind turbine generator system using an electro-hydraulic servo synchronizer.

As shown in FIG. 2, the mechanical and electrical transmission chains of a wind turbine generator system using an electro-hydraulic servo synchronizer mainly comprise a wind wheel, an accelerating gearbox, an electro-hydraulic servo synchronizer and a synchronous generator. The accelerating gearbox outputs a variable rotational speed, which is converted into a constant rotational speed through the electro-hydraulic servo synchronizer, the constant rotational speed is input into the synchronous generator to obtain a desired frequency of the power grid for direct grid-connection. The system uses low-power electrical elements to control the servo motor 11, realizes synchronization control via a direct drive volume control system and a differential planetary drive mechanism, replaces a converter consisting of high-power electrical elements, and improves the reliability of the whole system.

Figure 3:
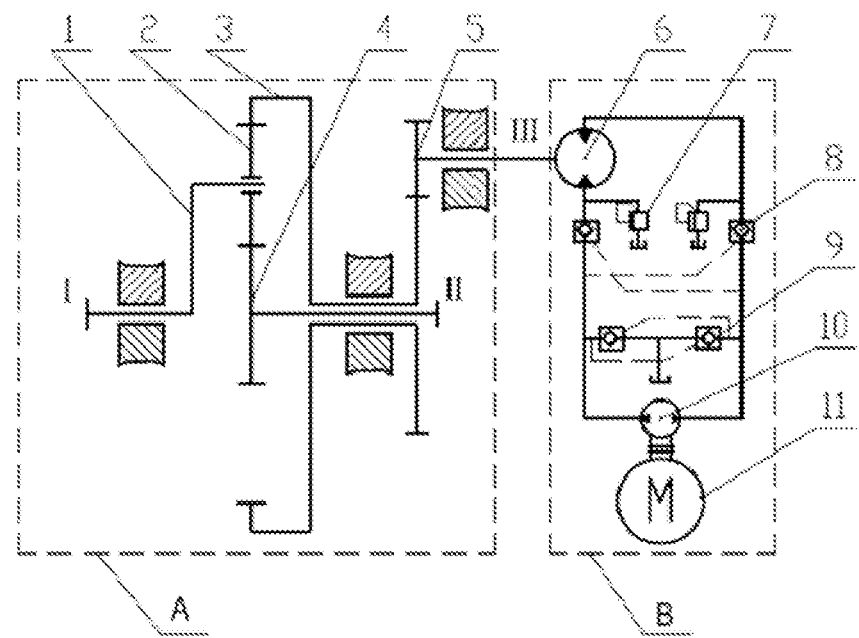
FIG. 3 is a structural schematic diagram of an electro-hydraulic servo synchronizer for MW wind turbine generator system.

As shown in FIG. 3, the present invention mainly includes A and B parts, A is a 2K-H differential planetary drive mechanism, and B is a direct drive volume control system. The input shaft I is connected with the accelerating gearbox, the output shaft II is connected with the generator, A and B are connected together via the shaft III. The rotational speed of the input shaft I changes constantly, the output rotational speed of system B is adjusted based on the rotational speed of the input shaft I and is transmitted to system A through the shaft III. The differential action between input shaft I and the shaft III ensures a constant speed of the output shaft II, such that the purpose of constant input rotational speed of the generator can be achieved. The control for rotational speed is realized by a control system, and meantime the control system receives a control signal from a main control system of the whole wind turbine generator system and performs processing, to make the electro-hydraulic servo synchronizer meet the operating requirements for the whole system.

System A is a 2K-H differential planetary drive mechanism, which includes a planet carrier 1, a planet gear 2, a ring gear 3, a sun gear 4 and a control gear 5, and ensures a constant speed of the output shaft II by a differential action between the input shaft I and shaft III. The rotational speed of shaft III is adjusted based on that of the input shaft I, such that constant rotational speed of output shaft II can be guaranteed, and only after calculation of power flow and selection of an appropriate proportional coefficient K of rotational speed between the input shaft I and shaft III, the closed power can be reduced and a high system efficiency can be ensured.

System B is a direct drive volume control system, which includes a constant displacement motor 6, a relief valve 7, a hydraulic lock 8, an oil make-up valve 9, a two-way constant delivery pump 10, a servo motor 11. The output flow and direction of the two-way constant delivery pump 10 can be controlled through controlling the rotational speed and direction of the servo motor 11, and further the rotational speed and direction of the constant displacement motor 6 is controlled. The relief valve 7 prevents destruction caused by the impact load on system B, and the hydraulic lock 8 consists of two hydraulic check valves II 19, preventing rollback of the constant displacement motor 6, the oil make-up valve 9 consisting of two hydraulic check valves I 18 can supplement oil leakage for the system.

The system can be connected between an accelerating gearbox and a synchronous generator in series, also can be integrated with the accelerating gearbox, and selection can be made according to the design requirements for the whole wind turbine generator system.

Figure 4:
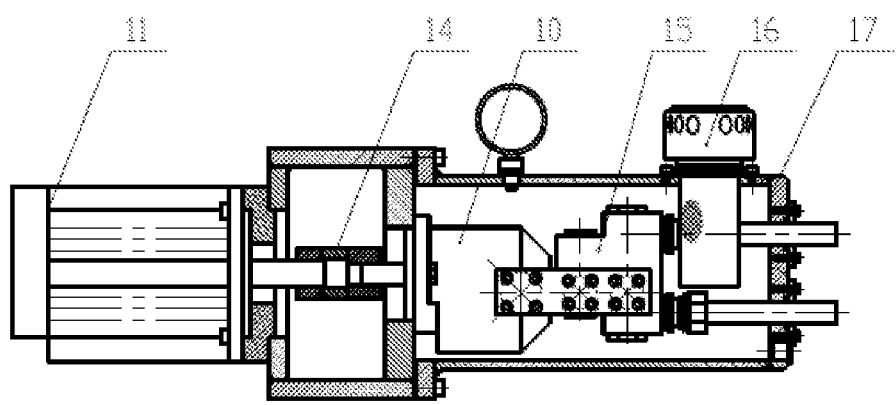
FIG. 4 is a structural schematic diagram of a hydraulic power set.

As shown in FIG. 4, the hydraulic power set mainly includes a two-way constant delivery pump 10, a servo motor 11, a coupling 14, an integrated valve block 15, a supercharged air filter 16, a sealed oil tank 17. The supercharged air filter 16 keeps the sealed oil tank 17 maintaining a certain positive pressure, ensures the oil make-up valve absorb oil normally, and once the pressure in the sealed oil tank 17 exceeds a preset pressure, the excessive air is discharged.

Figure 5:
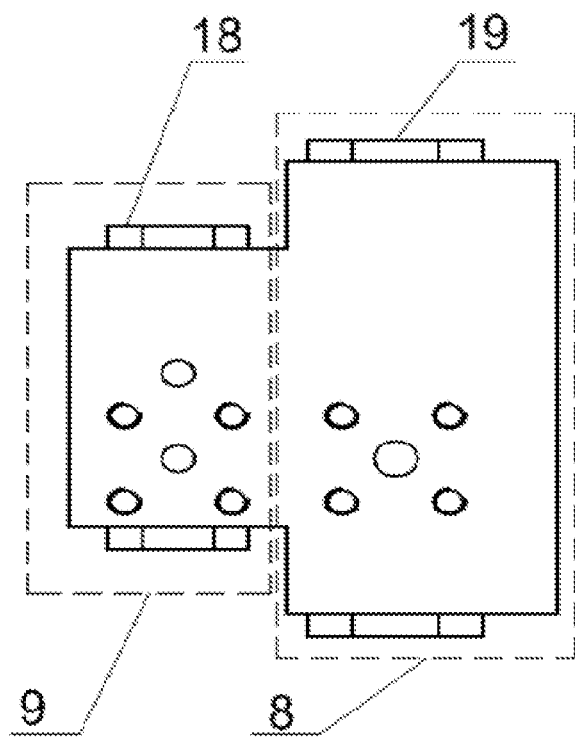
FIG. 5 is a structural diagram of an integrated valve block.

As shown in FIG. 5, the integrated valve block 15 includes a hydraulic lock 8 and an oil make-up valve 9. The integrated valve block 15 is designed to reduce pipelines and joints, which is a common method of ductless connection in a hydraulic system, it can simplify the design and installation of the hydraulic system, and facilitate the realization of the integration and standardization of the hydraulic system. It also can prevent the leakage of the hydraulic oil, reduce the volume of the flow channel, and improve the dynamic performances of the system.

Figure 6:
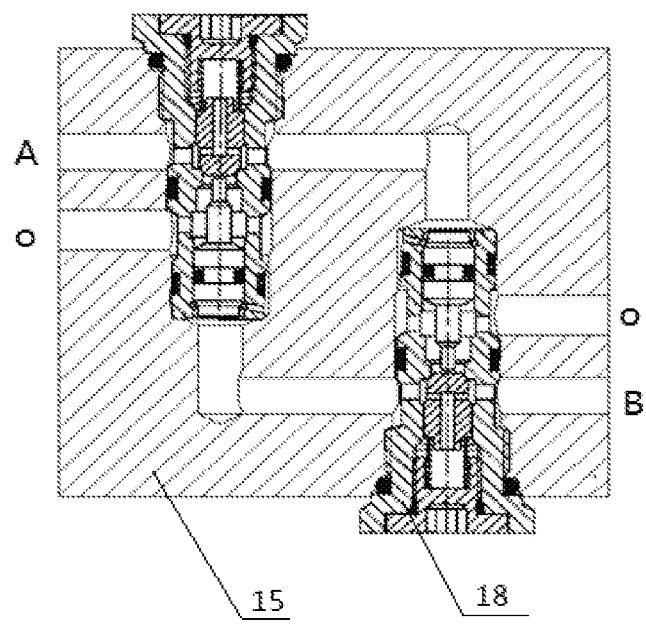
FIG. 6 is a structural diagram of an oil make-up valve.

As shown in FIG. 6, the oil make-up valve 9 includes one pair of hydraulic check valves I 18 inserted into the integrated valve block 15, and the hydraulic check valve I 18 is a standard part, which has high reliability, and the price is low, the inserted structure can ensure good sealing, free of leakage and reliable oil absorption. In FIG. 6, oil make-up ports A, B are connected to the oil inlet and oil outlet of the two-way constant delivery pump 10, respectively, and the oil absorption port O is directly immersed in the oil of the sealed oil tank 17.

Figure 7:
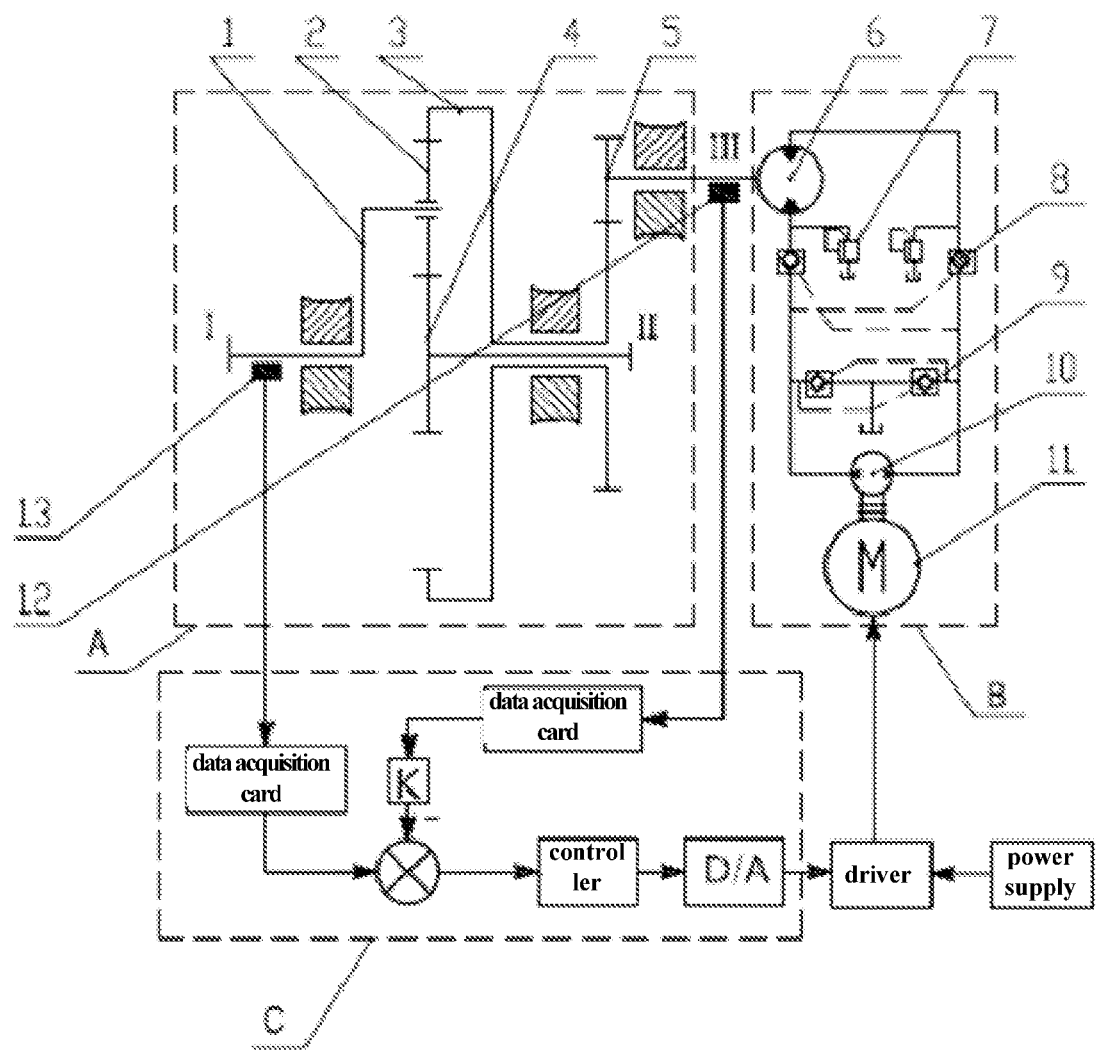
FIG. 7 is a schematic diagram of a control system of the electro-hydraulic servo synchronizer.

As shown in FIG. 7, C is a control system for conducting a real-time control on the electro-hydraulic servo synchronizer, meanwhile the control system C is connected with the main control system of the whole wind turbine generator system, receives a control signal from the main control system and performs processing. The rotational speed sensor I 12 and rotational speed sensor II 13 detect the rotational speed of shaft III and input shaft I, respectively, after the conversion via a data acquisition card, the corresponding value of shaft III is multiplied by the proportional coefficient K and then is subtracted from the corresponding value of input shaft I, the obtained value is the input of the controller, wherein K is obtained in accordance with the characteristics of the differential gear train so as to maximum the efficiency of differential gear system. The controller conducts analysis and calculation on the input signal, which is converted into a signal acceptable by the driver of the servo motor 11 after a D/A conversion, thus conducts controlling over the servo motor 11. System A is a 2K-H differential planetary drive mechanism, and B is a direct drive volume control system, C is a control system, and the above three forms a control system of closed loop, ensuring the system can output a synchronous rotational speed and work reliably and efficiently.

What is claimed is:

1. An electro-hydraulic servo synchronizer for a megawatt (MW) wind turbine generator system, comprising a differential planetary drive mechanism and a direct drive volume control system, wherein the differential planetary drive mechanism comprises a planet carrier, a planet gear, a ring gear, a sun gear, and a control gear, the planet gear is mounted on the planet carrier, the planet gear meshes with the sun gear and the ring gear, respectively, a central shaft of the ring gear is connected with the control gear, an input of the planet carrier is an input shaft (I), an output of the sun gear is an output shaft (II), a central shaft of the control gear is a shaft (III); the direct drive volume control system comprises a constant displacement motor, a two-way constant displacement pump and a servo motor, the servo motor is connected with the two-way constant displacement pump, the two-way constant displacement pump is connected with the constant displacement motor, the constant displacement motor is connected with the shaft (III), so as to drive the control gear.

2. The electro-hydraulic servo synchronizer for MW wind turbine generator system according to claim 1, wherein, a relief valve, a hydraulic lock and an oil make-up valve are provided between the constant displacement motor and the two-way constant displacement pump, the hydraulic lock and the oil make-up valve are provided within an integrated valve block.

3. The electro-hydraulic servo synchronizer for MW wind turbine generator system according to claim 2, wherein the relief valve is connected with the constant displacement motor.

4. The electro-hydraulic servo synchronizer for MW wind turbine generator system according to claim 2, wherein the oil make-up valve comprises two first hydraulic check valves, and the two first hydraulic check valves are respectively connected with an inlet and an outlet of the two-way constant delivery displacement pump directly.

5. The electro-hydraulic servo synchronizer for MW wind turbine generator system according to claim 2, wherein the hydraulic lock comprises two second hydraulic check valves, and the two second hydraulic check valves are respectively connected with an inlet and an outlet of the constant displacement motor directly.

6. The electro-hydraulic servo synchronizer for MW wind turbine generator system according to claim 2, wherein the direct drive volume control system further comprises a sealed oil tank and a supercharged air filter, wherein the two-way constant displacement pump, the hydraulic lock and the oil make-up valve are provided within the sealed oil tank, the supercharged air filter is installed on the sealed oil tank and is in fluid communication with interior of the sealed oil tank.

7. The electro-hydraulic servo synchronizer for MW wind turbine generator system according to claim 1, wherein the input shaft I is connected with an accelerating gearbox in a transmission chain of the wind turbine generator system, the output shaft (III is connected with the generator in the transmission chain of the wind turbine generator system.

8. The electro-hydraulic servo synchronizer for MW wind turbine generator system according to claim 1, wherein the servo motor is connected with the two-way constant displacement pump via a coupling.

\* \* \* \* \*